Nov. 24, 1942.  E. H. STEMPEL  2,302,812

ADJUSTABLE MOTOR SUPPORTING BRACKET

Filed March 3, 1941

INVENTOR
EDWARD H. STEMPEL
BY A.S.Krotz
ATTORNEY

Patented Nov. 24, 1942

2,302,812

UNITED STATES PATENT OFFICE 2,302,812

ADJUSTABLE MOTOR SUPPORTING BRACKET

Edward H. Stempel, Racine, Wis., assignor to Young Radiator Company, Racine, Wis., a company of Wisconsin Application March 3, 1941, Serial No. 381,431

4 Claims. (Cl. 248—16)

The present invention relates to adjustable motor supports particularly adapted for use on air conditioning cabinets and the like.

The principal object of my invention is to provide a support for motors and the like which can be readily adjusted for the reception of the motor holding bolts when variously spaced.

An object of my invention is to provide a motor support having means for adjusting the tautness of the belt or sprocket chain and for positioning motors of various sizes relative to the cabinet and for different length belts or chains.

Another object of my invention is to provide a motor support that can, when desired, be shipped separately or attached to the motor with or without the members which are attached to the cabinet and whereby when such attaching members are shipped with the cabinet, they may be moved temporarily into the cabinet so there will be no protruding ends.

An advantage of the present invention is that by loosening the fastenings, the motor may be moved slightly out of right angle position with the supporting bars or it may be moved bodily transversely in order to align the sprockets or pulleys.

The above objects are accomplished by means of parts, combinations of parts, or their equivalents, and mode of adjusting, as hereinafter set forth and claimed and shown in the accompanying drawing in which:

Figure 1:
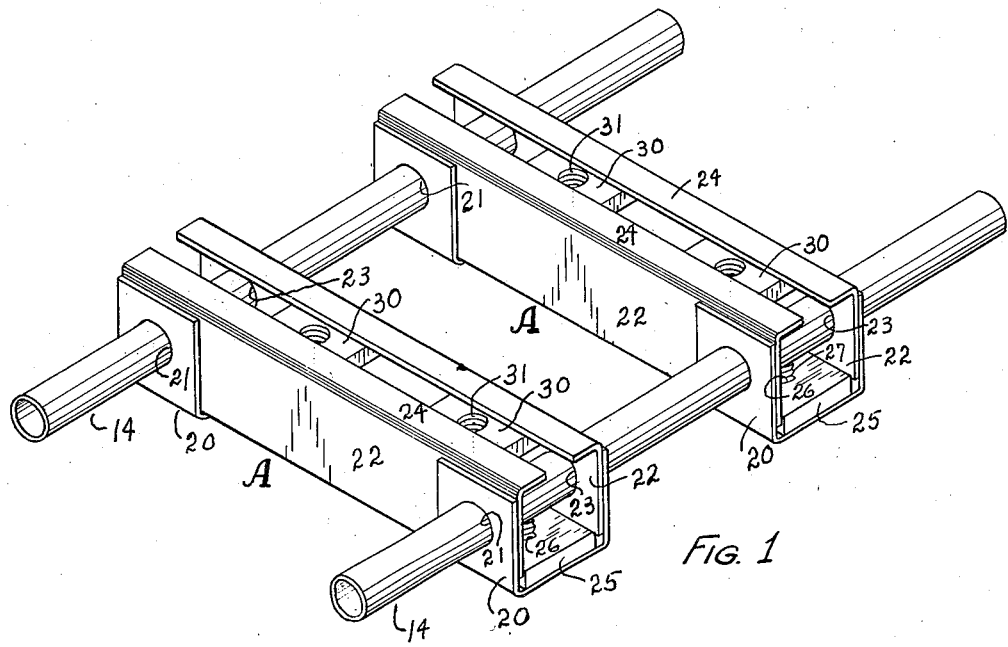
Fig. 1 is an isometric view of my complete device.

As thus illustrated, numeral 10 designates the side or end panel of the cabinet, numeral 11 designates the bottom or partition wall of the cabinet. Two spaced brackets 12—12 (one not shown) are secured to the cabinet preferably as illustrated, having a set screw 13. Brackets 12 and member 10 are provided with corresponding openings through which spaced bars or tubes 14 are slidably mounted.

Brackets 15—15 (one not shown) are preferably secured to member 11, as illustrated and spaced a short distance from member 12 and having apertures through which members 14 are slidably mounted. It will be seen that members 14 may be moved longitudinally and secured in any desired position by means of the set screws.

When the supporting brackets, which are designated in their entireties by reference characters A—A are shipped attached to the motor, members 14 may be positioned in the cabinet so the outer ends are flush with members 10 and secured in this position.

The supporting bracket proper comprises two assemblies A, each consisting of two inverted U-shaped members 20, each flange having apertures 21 through which members 14 slidably extend. Two angle irons 22—22 are positioned in brackets 20, as illustrated, and having apertures 23 which register with apertures 21 through which members 14 are slidably extended.

Flanges 24, of members 22 are relatively narrow and member 20 is designed so the space between flanges 24 is very little greater than the size of the motor holding bolts, as will hereinafter appear.

Blocks 25 are positioned in members 20, as illustrated, having screw threaded openings 26. Members 20 have openings slightly larger than the screw threaded openings 26 which register with these openings. Set screws 27 are screw threaded into openings 26 and are used for locking members A to members 14 in any desired position.

I provide blocks 30—30 which are as illustrated, slidably mounted under members 24 and each being screw threaded, as at 31.

Figure 2:
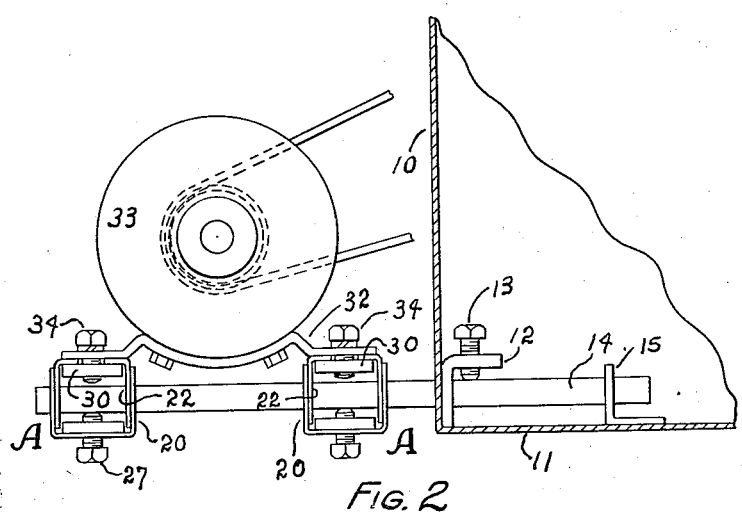
Fig. 2 is an end elevational view of my device, showing a motor mounted thereon and the device is shown as mounted on a cabinet, the cabinet being shown fractionally.

Motors are usually provided with supporting pads or brackets having four holding bolt apertures on opposite sides of the motor. One common design is illustrated in Figure 2 wherein a bracket 32 is secured to motor 33. The brackets, at opposite ends, are provided with two openings for the reception of cap screws 34 (two not shown), the cap screws being screw threaded into blocks 30.

It will be noted that blocks 30 may be spaced to accommodate the openings in opposite sides of bracket 32 and that members A may be spaced on members 14 to accommodate the spacings of the bolts in the other direction. It will be seen that members 14 may be adjusted longitudinally to accommodate various sizes of motors at various distances from the cabinet.

Clearly by the use of the two members A and two members 14, any size motor, with variously spaced bolt apertures may be securely mounted on the cabinet and after so mounted, the motor may be adjusted to and from the cabinet. Members A may be attached to the motor for shipment and members 14 may be attached to the cabinet for shipment or these members may be secured together as illustrated in Figure 2 for shipment.

It will be seen that members A are made from flat stock and without machining, the manufacturing process being limited to bending, drilling and tapping, thus providing a very light, strong structure which can be manufactured at low cost suitable for any size cabinet or motor.

Clearly, by loosening the fastening means between members 14 and A, the motor may be moved slightly out of right angle position with rods 14 or the motor may be moved bodily at right angles to the rods after loosening cap screws 34. Thus I provide means for perfectly aligning the driving connections.

Clearly many minor detail changes may be made without departing from the spirit and scope of the present invention, as recited in the appended claims.

Having thus shown and described my invention, I claim:

1. A motor support of the class described, comprising spaced bars, two transverse members through which said bars slidably extend and may be secured in selective positions, means longitudinally slidable on said transverse members and having means for the reception of motor holding bolts whereby said bolts may be moved various distances apart longitudinally or transversely, said transverse members comprising spaced elongated angle irons, one flange being considerably narrower than the other, the narrow flanges extending inwardly and being spaced apart, U-shaped brackets adapted to embrace the ends of said transverse members, openings in said transverse members and brackets through which said bars extend, blocks positioned on the bottom of said brackets having threaded openings which register with other openings in said brackets, set screws in said threaded openings whereby said transverse members may be locked into position on said bars, blocks slidably mounted under said narrow flanges and having apertures for the reception of motor fastening bolts, whereby motors having variously spaced holding bolts may be mounted on said support.

2. A support comprising a pair of spaced parallel members, a second pair of spaced parallel members at approximately right angles to said first members and in slidable relation thereto, each of said second parallel members consisting of a pair of spaced L-shaped members and a pair of spaced U-shaped members adapted to embrace and hold said L-shaped members in spaced relation, means whereby said first parallel members extend through said second parallel and U-shaped members, one flange of each said second parallel members being at the top and turned inwardly, their free edges being spaced apart, means on said U-shaped members adapted to lock the second parallel members to said first parallel members.

3. An adjustable motor support of the class described, comprising fixed spaced parallel members, one or more second members through which said parallel members slidably extend, said second members comprising two inverted L-shaped members with the flanges turned inwardly, the edges spaced a short distance apart, two spaced U-shaped members adapted to contact the vertical part of said L-shaped members and through which said parallel members extend, blocks in the bottom of said U-shaped members, set screws threaded in said blocks and extending through said U-shaped members adapted to contact said parallel members for fixed adjustments thereto, two threaded blocks slidably mounted under said inwardly turned flanges having means whereby a motor having variously positioned bolts may be secured to said second members.

4. An adjustable motor support of the class described, comprising fixed spaced parallel members, two second members through which said parallel members slidably extend, said second members each comprising two inverted L-shaped members with the flanges turned inwardly, the edges spaced a short distance apart, two spaced U-shaped members adapted to contact the vertical part of said L-shaped members and through which said parallel members extend, blocks in the bottom of said U-shaped members, set screws threaded in said blocks and extending through said U-shaped members adapted to contact said parallel members for fixed adjustments thereto, threaded blocks slidably mounted under said inwardly turned flanges having means whereby a motor having variously positioned bolts may be secured to said second members, said parallel members adapted to be slidably and detachably secured to a cabinet.

EDWARD H. STEMPEL.